United States Patent [19]

Nomura et al.

[11] 4,436,975

[45] Mar. 13, 1984

[54] WIRE-CUT, ELECTRIC DISCHARGE MACHINING METHOD

[75] Inventors: Yoshiyuki Nomura; Kanemasa Okuda, both of Hino; Hisao Ishii, Mitaka, all of Japan

[73] Assignee: Fujitsu Fanuc Limited, Tokyo, Japan

[21] Appl. No.: 288,188

[22] Filed: Jul. 29, 1981

[30] Foreign Application Priority Data

Aug. 4, 1980 [JP] Japan ................................ 55-106857

[51] Int. Cl.³ ............................................ B23P 1/08
[52] U.S. Cl. ............................ 219/69 W; 219/69 M; 204/225
[58] Field of Search ................ 219/69 E, 69 D, 69 R, 219/68, 69 V, 69 W; 204/129.6, 225, 129.2

[56] References Cited

U.S. PATENT DOCUMENTS 3,939,321  2/1976  Bertrand et al. ............... 219/69 D

FOREIGN PATENT DOCUMENTS 2351357  3/1975  Fed. Rep. of Germany ... 219/69 D
2755724  6/1979  Fed. Rep. of Germany ... 219/69 W
2809506  9/1979  Fed. Rep. of Germany ... 219/69 W

*Primary Examiner*—M. H. Paschall
*Attorney, Agent, or Firm*—Staas & Halsey

[57] ABSTRACT

A wire-cut, electric discharge machining method in which a wire is inserted into a machining start hole made in a workpiece to start electric discharge machining from the machining start hole, a bushing of a conductive material is pressed into a hole made in the workpiece to provide the machining start hole.

3 Claims, 4 Drawing Figures

(A)

(B)

WIRE-CUT, ELECTRIC DISCHARGE MACHINING METHOD

BACKGROUND OF THE INVENTION

1. Field of the Invention

The present invention relates to a wire-cut, electric discharge machining method which ensures automatic insertion of the tip of a wire electrode into the machining start hole even if there is scale or the like developed on the inside of a machining start hole or there is a relief on the back of a workpiece.

2. Description of the Prior Art

In a wire-cut, electric discharge machine of the type in which a pulse-like voltage is applied across a linear electrode, such as a wire or the like, and a workpiece to produce therebetween a discharge for machining the workpiece into a desired configuration, the machining is usually started from a machining start hole made in the workpiece for the insertion thereinto of the wire.

Ordinarily, workpieces are mostly formed of iron or like material and heat treated. Since the machining start hole is usually made prior to the heat treatment, scale or the like is developed by the heat treatment on the inside of the machining start hole. Accordingly in order to provide a good surface roughness on the inner surface of the machining start hole, the scale or the like must be removed, for example, by means of machining with reamer, but the removing machining is difficult and time-consuming because the machining start hole is small and the scale sticks to the inside of the machining start hole.

In recent years there has often been employed a wire-cut, electric discharge machine such as shown in FIG. 1 which uses feed rollers 6 revolving with a wire 4 gripped therebetween to raise it and a wire guide nozzle 5 guiding the wire 4 to move it up, automatically inserting its tip into a machining start hole 3 made in a workpiece 1. In the case where there is a relief 2 on the back of the workpiece 1 as shown in FIG. 1, however, the tip of the wire 4 may not sometimes be inserted into the machining start hole 3; therefore, there is a strong demand for improvement of the prior art in this respect. In FIG. 1, reference numeral 7 indicates a V-groove guide; 8 designates a conducting pin; 9 and 10 identify guide rollers; 11 denotes a brake; and 12 represents a wire reel.

SUMMARY OF THE INVENTION

In view of the abovesaid defect of the prior art, the present invention is to provide a wire-cut, electric discharge machining method which eliminates the influence of scale or the like developed by heat treatment on the inside of a machining start hole and, even if a relief exists on the back of a workpiece, ensures automatic insertion of the tip of the workpiece into the machining start hole.

According to the present invention, in a wire-cut, electric discharge machining method of the type in which a wire is inserted into a machining start hole made in a workpiece to start electric discharge machining from the machining start hole, a bushing with good inner surface roughness made of a conductive material is pressed into a hole made in the workpiece to provide the machining start hole.

DESCRIPTION OF THE PREFERRED EMBODIMENTS

Figure 2:
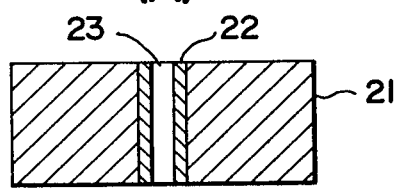
FIGS. 2(A) and 2(B) are a sectional view and a top plane view illustrating an embodiment of the present invention.
Figure 2:
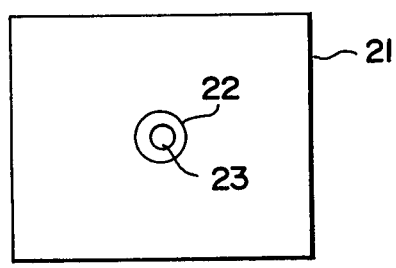

FIGS. 2(A) and 2(B) are respectively a sectional view and a top plane view illustrating an embodiment of the present invention. A cylindrical bushing 22 of iron, brass or like conductive material, finished with high accuracy and with good surface roughness on the inner surface thereof, is driven into a hole made in a workpiece 21 to provide a machining start hole 23. This permits easy removal of scale developed by heat treatment.

Figure 3:
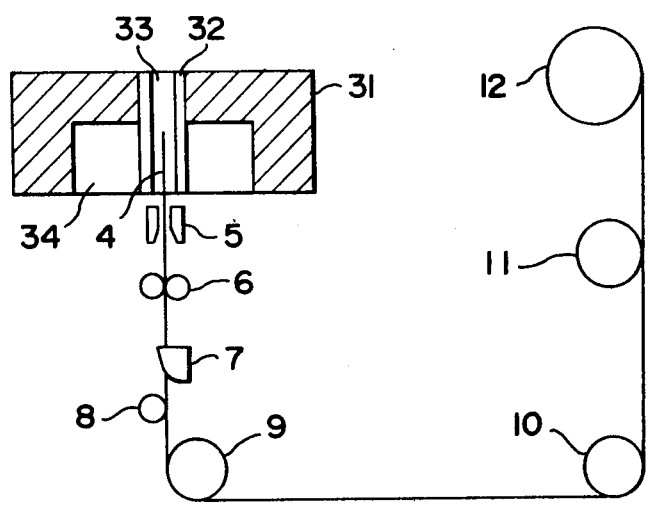
FIG. 3 is explanatory of another embodiment of the present invention.

FIG. 3 is explanatory of another embodiment of the present invention which is adapted to ensure insertion of the tip of the wire 4 into a machining start hole 33 in the case where a relief 34 exists on the back of a workpiece 31.

Figure 1:
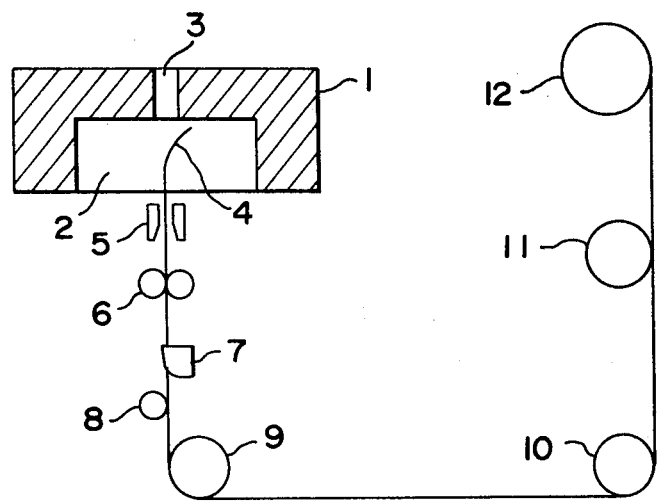
FIG. 1 is explanatory of a prior art example.

That is, a cylindrical bushing 32 made of iron, brass or conductive material and having the same length as the thickness of the workpiece 31 is driven into a hole made in the workpiece 31 to provide the machining start hole 33. By this, the distance between the top end portion of the wire guide nozzle 5 and the bottom of the bushing 32 can be reduced, so that the tip of the wire 4 brought up while being restricted by the wire guide nozzle 5 can positively be inserted into the machining start hole 33. Also in this case, scale or the like developed by heat treatment can easily be removed as described previously. In FIG. 3, the parts corresponding to those in FIG. 1 are identified by the same references.

As has been described in the foregoing, according to the present invention, a conductive bush is pressed into a hole made in a workpiece to form a machining start hole, so that scale or the like developed by heat treatment can easily be removed and, even in the case where a relief is present on the back of the workpiece, the wire tip can automatically be inserted into the machining start hole.

It will be apparent that many modifications and variations may be effected without departing from the scope of the novel concepts of this invention.

What is claimed is:

1. A wire-cut, electric discharge machining method in which a wire is inserted into a machining start hole made in a workpiece to start electric discharge machining from the machining start hole, comprising the steps of:
   (a) forming a bushing of a conductive material; and
   (b) increasing the conductivity of the start hole by pressing the bushing into a start hole made in the workpiece to provide the machining start hole.

2. A wire-cut, electric discharge machining method according to claim 1, wherein step (a) further comprises machining the bushing to a length greater than the depth of the start hole made in the workpiece.

3. A wire-cut, electric discharge machining method according to claim 1, wherein step (a) further comprises machining the bushing to a length equal to the depth of the start hole made in the workpiece.

* * * * *